(12) United States Patent
Qiu et al.

(10) Patent No.: US 11,392,864 B2
(45) Date of Patent: Jul. 19, 2022

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Zekai Qiu, Nisshin (JP); Akie Sakiyama, Toyota (JP); Yusuke Takeuchi, Miyoshi (JP); Jun Hioki, Nagakute (JP); Shinji Sassa, Ama (JP); Hiromitsu Fujii, Kariya (JP); Keita Teruuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 16/782,285

(22) Filed: Feb. 5, 2020

(65) Prior Publication Data

US 2020/0250594 A1 Aug. 6, 2020

(30) Foreign Application Priority Data

Feb. 6, 2019 (JP) .............................. JP2019-020126

(51) Int. Cl.
| | | |
|---|---|---|
| *G06Q 10/04* | (2012.01) | |
| *G01C 21/34* | (2006.01) | |
| *B60P 3/025* | (2006.01) | |
| *G06Q 10/08* | (2012.01) | |
| *G06Q 30/02* | (2012.01) | |
| *G05D 1/02* | (2020.01) | |

(Continued)

(52) U.S. Cl.
CPC ....... *G06Q 10/047* (2013.01); *G01C 21/3407* (2013.01); *G05D 1/0212* (2013.01); *G06Q 10/087* (2013.01); *G06Q 10/08355* (2013.01); *G06Q 30/0204* (2013.01); *B60P 3/0257* (2013.01); *B60W 60/0025* (2020.02); *G05D 1/0088* (2013.01); *G05D 2201/0213* (2013.01)

(58) Field of Classification Search
CPC ........... G06Q 10/047; G06Q 10/08355; G06Q 10/087; G06Q 30/0204; G01C 21/3407; G05D 1/0212; G05D 1/0088; G05D 2201/0213; B60W 60/0025; B60P 3/0257
See application file for complete search history.

(56) References Cited

U.S. PATENT DOCUMENTS

| | | | |
|---|---|---|---|
| 10,037,519 B2 * | 7/2018 | Proud ................. | G06Q 20/202 |
| 2011/0313840 A1 * | 12/2011 | Mason ................. | H04W 4/029 |
| | | | 705/14.35 |
| 2017/0124547 A1 * | 5/2017 | Natarajan ............... | G07F 9/001 |

FOREIGN PATENT DOCUMENTS

| | | |
|---|---|---|
| JP | 2002-049780 A | 2/2002 |
| JP | 2003-122991 A | 4/2003 |
| JP | 2018-177439 A | 11/2018 |

\* cited by examiner

*Primary Examiner* — Ig T An
(74) *Attorney, Agent, or Firm* — Oliff PLC

(57) ABSTRACT

An information processing system includes: a movable object that operates as a movable shop after business hours of a predetermined shop; and a control unit that executes acquiring product information, the product information being information relevant to a plurality of foodstuffs loaded in the movable object, each of the plurality of foodstuffs being a product of the predetermined shop and being discounted due to an expiration date, and controlling a route of the movable object based on the product information. The control unit controls the route of the movable object, based on a ratio of kinds of the plurality of foodstuffs loaded in the movable object, as the product information.

7 Claims, 11 Drawing Sheets

(51) Int. Cl.
*B60W 60/00* (2020.01)
*G05D 1/00* (2006.01)

FIG. 5

| VEHICLE ID | SHOP ID | SERVICE STATE | POSITION INFORMATION |
|---|---|---|---|
| V001 | S001 | STANDBY | |
| V002 | S002 | CRUISING | |
| V003 | S003 | STANDBY | |

FIG. 6

| SHOP ID | TARGET REGION |
|---|---|
| S001 | A001, A002, ... |
| S002 | A101, A102, ... |
| S003 | A201, A202, ... |

FIG. 7

| USER ID | SHOP ID | SEX | REGION ID | FAMILY STRUCTURE |
|---|---|---|---|---|
| U001 | S001 | FEMALE | A001 | TWO ADULTS, TWO CHILDREN |
| U002 | S002 | MALE | A002 | SINGLE |
| U003 | S003 | MALE | A003 | TWO ADULTS |

FIG. 8

| REGION ID | CLASSIFICATION |
|---|---|
| A001 | SINGLE-PERSON HOUSEHOLD |
| A002 | FAMILY |
| A003 | THE NUMBER OF HOUSEHOLDS IS SMALL |

FIG. 9

| PRODUCT ID | KIND | EXPIRATION DATE | REGULAR PRICE | DISCOUNT PRICE | PURCHASE |
|---|---|---|---|---|---|
| K001 | BREAD | MMDDTT | Y11 | | NOT PURCHASED |
| K002 | DAILY DISH | MMDDTT | Y12 | | PURCHASED |
| K003 | FRESH FOOD | MMDDTT | Y13 | | NOT PURCHASED |

INFORMATION PROCESSING SYSTEM AND INFORMATION PROCESSING METHOD

INCORPORATION BY REFERENCE

The disclosure of Japanese Patent Application No. 2019-020126 filed on Feb. 6, 2019 including the specification, drawings and abstract is incorporated herein by reference in its entirety.

BACKGROUND

1. Technical Field

The disclosure relates to an information processing system and an information processing method.

2. Description of Related Art

It is proposed that an automatic driving vehicle delivers a parcel to a delivery box at a delivery destination (for example, Japanese Patent Application Publication No. 2018-177439).

SUMMARY

An aspect of the disclosure provides an information processing system and an information processing method that make it possible to reduce the wastage rate of food.

An aspect of the disclosure is an information processing system including: a movable object that operates as a movable shop after business hours of a predetermined shop; and a control unit that executes acquiring product information, the product information being information relevant to a plurality of foodstuffs loaded in the movable object, each of the plurality of foodstuffs being a product of the predetermined shop and being discounted due to an expiration date, and controlling a route of the movable object based on the product information.

An aspect of the disclosure is an information processing method including: acquiring product information, the product information being information relevant to a plurality of foodstuffs loaded in a movable object, the movable object operating as a movable shop after business hours of a predetermined shop, each of the plurality of foodstuffs being a product of the predetermined shop and being discounted due to an expiration date; and controlling a route of the movable object based on the product information.

With the information processing system and the information processing method in the disclosure, it is possible to reduce the wastage rate of food.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is an example of a vehicle information management table;

FIG. 6 is an example of a shop information management table;

FIG. 7 is an example of a user information management table;

FIG. 8 is an example of a region information management table;

FIG. 9 is an example of a product information management table;

DETAILED DESCRIPTION OF EMBODIMENTS

Figure 1:
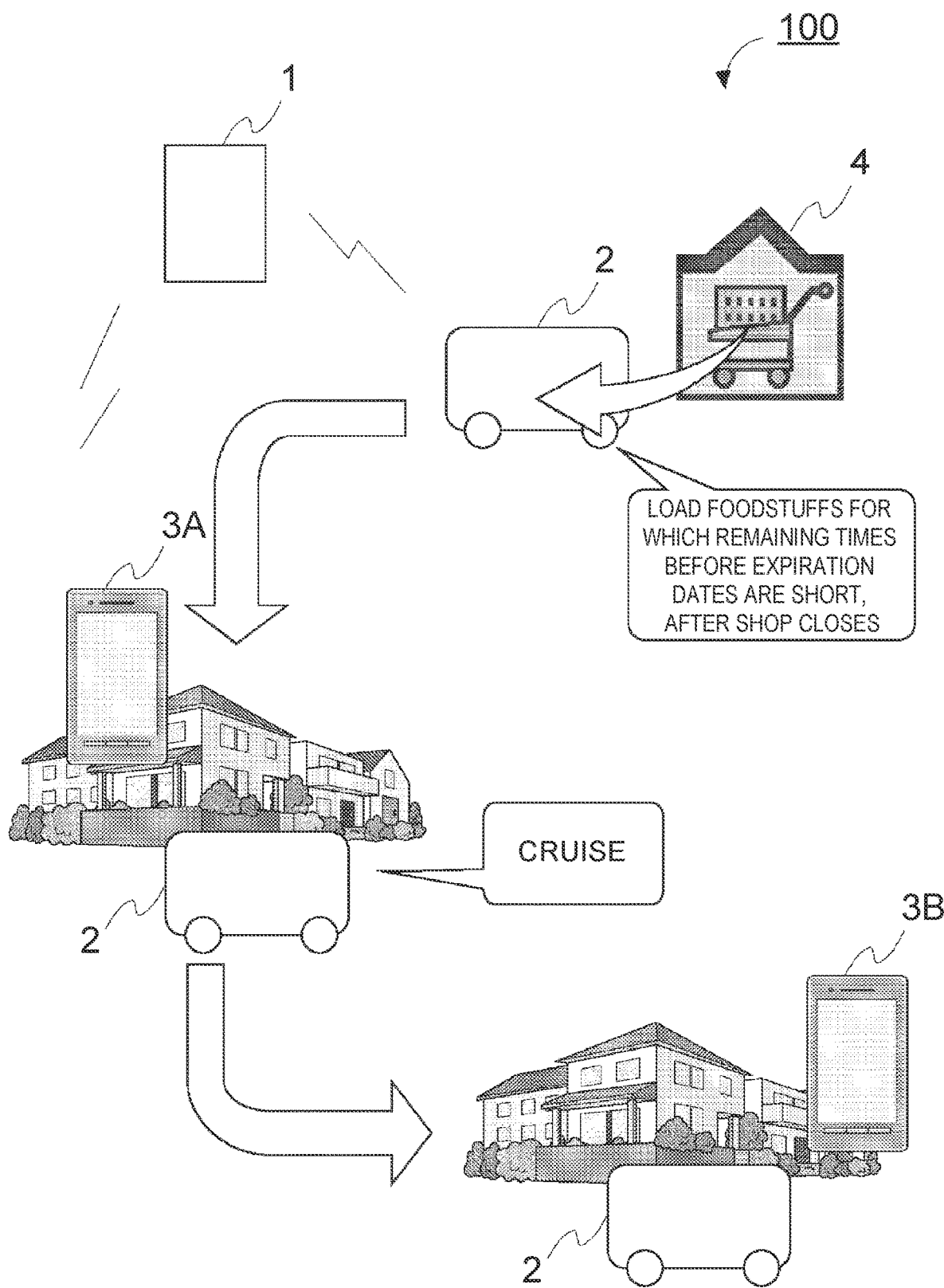
FIG. 1 is a diagram showing an example of a system configuration of a movable shop management system according to a first embodiment.

An aspect of the disclosure is an information processing system including: a movable object that operates as a movable shop after business hours of a predetermined shop; and a control unit that executes acquiring product information, the product information being information relevant to a plurality of foodstuffs loaded in the movable object, each of the plurality of foodstuffs being a product of the predetermined shop and being discounted due to an expiration date, and controlling a route of the movable object based on the product information. For example, the movable object may be a vehicle that can perform autonomous traveling. However, the movable object is not limited to this, and may be a vehicle that travels with driving by a driver.

With the aspect of the disclosure, it is possible to set an opportunity to sell the foodstuffs even after the business hours of the shop, and it is possible to cut waste of food. Further, it is possible to increase sales of the shop.

In the aspect of the disclosure, the control unit may control the route of the movable object, based on a ratio of kinds of the plurality of foodstuffs loaded in the movable object, as the product information. In this case, the control unit may control the route of the movable object, such that the movable object goes to a region for which it is predicted that there is demand for a kind of foodstuff having the highest value in the ratio.

The ratio of the kinds of foodstuffs that are not sold out within the business hours of the shop are likely to vary from day to day. Therefore, by controlling the route of the movable object based on the ratio of the kinds of the plurality of foodstuffs loaded in the movable object, it is possible to deliver the foodstuffs to a region where there is more demand, so that the foodstuffs loaded in the movable object are likely to be sold.

In the aspect of the disclosure, the control unit may alter the route of the movable object, depending on a change in the ratio. The ratio of the kinds of the foodstuffs loaded in the movable object is likely to change halfway through the traveling of the movable object, for example, due to purchase of foodstuffs or approach of the expiration date. Since the route is altered depending on variation in the ratio, the foodstuffs loaded in the movable object are likely to be sold.

In the aspect of the disclosure, the control unit may control the route of the movable object, based on remaining times before expiration dates of the plurality of foodstuffs loaded in the movable object, as the product information. Thereby, for example, the movable object can travel preferentially in a region for which it is expected that there is demand for a foodstuff for which the remaining time before the expiration date is short. Accordingly, the foodstuffs loaded in the movable object are likely to be sold.

In the aspect of the disclosure, the control unit may alter the route such that the movable object goes to a position of a user terminal, when a stop-off request from the user terminal is received. A user of the user terminal that is a sending source of the stop-off request is likely to purchase the product loaded in the movable object, and therefore, the foodstuffs are likely to be sold by the expiration date.

An aspect of the disclosure may be an information processing method. The information processing method includes: acquiring product information, the product information being information relevant to a plurality of foodstuffs loaded in a movable object, the movable object operating as a movable shop after business hours of a predetermined shop, each of the plurality of foodstuffs being a product of the predetermined shop and being discounted due to an expiration date; and controlling a route of the movable object based on the product information. The above-described technical ideas relevant to the information processing system can be applied to the information processing method, as long as there is no technical discordance.

Hereinafter, embodiments of the disclosure will be described based on the drawings. Configurations of the embodiments described below are examples, and the disclosure is not limited to the configurations of the embodiments.

First Embodiment

<Outline of System>

FIG. 1 is a diagram showing an example of a system configuration of a movable shop management system 100 according to a first embodiment. For example, the movable shop management system 100 is a system to manage a vehicle that serves as a movable shop and that transports, as products, foodstuffs for which remaining times before expiration dates are short, after business hours of a shop that sells foodstuffs, as exemplified by a supermarket. The movable shop management system 100 includes a center server 1, a vehicle 2 associated with a shop 4, and user terminals 3. The center server 1 is an example of an "information processing device".

For example, the vehicle 2 is a vehicle that can perform an automatic drive traveling and a driverless traveling. In the first embodiment, for example, the vehicle 2 is associated with the shop 4 that is a food store, and operates as a movable shop that sells foodstuffs as products after business hours of the shop 4. For example, the foodstuffs loaded in the vehicle 2 are foodstuffs for which the remaining times before expiration dates are short and the expiration dates come after a business end hour of the current day and before a business start hour of the next business day. However, without being limited to this, foodstuffs for which the expiration dates or freshness dates come in a few date may be loaded in the vehicle 2. Examples of the products loaded in the vehicle 2 include fresh foods, daily dishes, breads and packaged foods.

Generally, foodstuffs for which the remaining times before the expiration dates are short are often discounted. Therefore, even when the remaining times before the expiration dates are short, the demand is expected. Further, some persons cannot come to the shop during the business hours, and therefore, the demand for the foodstuffs is expected even outside the business hours. In the first embodiment, the products loaded in the vehicle 2 are products that are discounted because the remaining times before the expiration dates are short. The vehicle 2 moves to sell foodstuffs that are discounted because the remaining times before the expiration dates are short. Thereby, it is possible to cut waste of food due to the expiration dates, and it is possible to increase sales of the shop 4.

For example, the vehicle 2 and the user terminal 3 are connected with the internet via a wireless communication network, and is connected with the center server 1 through the internet. For example, each of the vehicle 2 and the user terminal 3 performs wireless communication in accordance with a standard of a mobile communication such as 3rd generation (3G), long term evolution (LTE), LTE-Advanced and 5th generation (5G) or a standard of a wireless LAN such as WiFi.

The vehicle 2 receives an operation command from the center server 1, creates an operation plan, and performs the autonomous traveling to a destination in accordance with the operation plan. The vehicle 2, which includes means for acquiring position information, acquires the position information and sends the position information to the center server 1, with a predetermined period.

The center server 1 controls an operation route of the vehicle 2. The center server 1 detects the start of the operation of the vehicle 2, and sends the detected information to the user terminal 3 that is previously registered in a service of the movable shop management system 100. In FIG. 1, user terminals 3A, 3B are described, but when the user terminals 3A, 3B are particularly not distinguished, the user terminals 3A, 3B are referred to as the user terminal 3.

In the first embodiment, the center server 1 controls the route of the vehicle 2, based on the ratio of the kinds of the foodstuffs loaded in the vehicle 2. For example, the ratio of the kinds of unsold foodstuffs in the shop 4 varies from day to day. Further, the vehicle 2 starts to travel after the business hours of the shop 4. Therefore, a period of time when the vehicle 2 travels is midnight, for example, and in view of this, users that demand a foodstuff vary depending on the kind of the foodstuff. For example, daily dishes and the like can be demanded even at midnight, by single office workers after work, and the like. For example, breads and the like can be demanded as next morning breakfasts, by married users.

Accordingly, in the first embodiment, the center server 1 generates the route of the vehicle 2, such that the vehicle 2 cruises in a region for which it is expected that there is demand for a kind of foodstuff that is loaded in the vehicle 2 and that has the highest value in the ratio. For example, the vehicle 2 parks at a previously set sale place in the region where the vehicle 2 cruises, for a predetermined time, and meets users. Thereby, the vehicle 2 sells the product. For example, the vehicle 2 includes settlement means such as self-checkout.

For example, the user terminal 3 can send a stop-off request for calling the vehicle 2 to a designated place, to the center server 1, through an application dedicated for the service of the movable shop management system 100. The center server 1 receives the stop-off request from the user terminal 3. Then, the center server 1 alters the route of the vehicle 2 such that the vehicle 2 goes to the place designated by the user terminal 3, and gives an instruction of the operation along the route after the alteration, to the vehicle 2.

Further, for example, the vehicle 2 can be hailed by the user, during the cruise, and can sell the product. The hailing of the vehicle 2 by the user is realized, for example, when the user makes a predetermined gesture or makes a predetermined voice such that the vehicle 2 recognizes the gesture or voice.

The ratio of the kinds of the foodstuffs loaded in the vehicle 2 varies depending on sale. Therefore, depending on the variation in the ratio of the kinds of the foodstuffs, the center server 1 alters the route of the vehicle 2, such that the vehicle 2 goes to the region for which it is expected that there is demand for a kind of foodstuff having the highest value in the ratio. Thereby, the vehicle 2 cruises to the region for which it is expected that there is demand for a kind of foodstuff that is loaded in the vehicle 2 and that has the highest value in the ratio, and therefore, the sale of the kind of foodstuff is expected to be further increased. Hereinafter, in the description of the product loaded in the vehicle 2, it is assumed that the product is a foodstuff.

Figure 2:
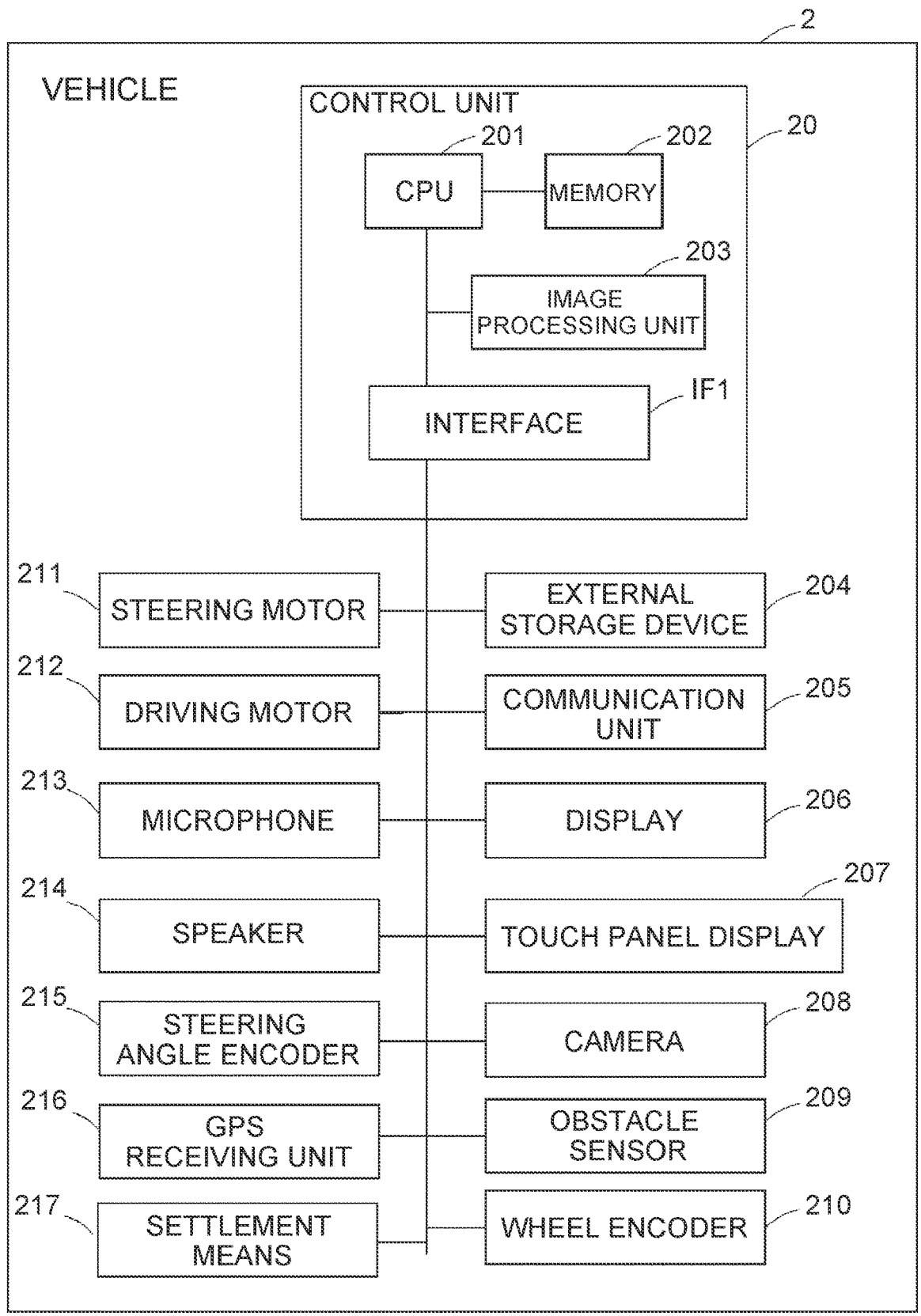
FIG. 2 is a diagram showing an example of a hardware configuration of a vehicle.

FIG. 2 is a diagram showing an example of a hardware configuration of the vehicle 2. FIG. 2 will be described, assuming that the vehicle 2 is a vehicle that can perform the autonomous traveling. In FIG. 2, hardware related to a control system is extracted and shown.

The vehicle 2 includes a control unit 20, an external storage device 204, a communication unit 205, a display 206, a touch panel display 207, a camera 208, an obstacle sensor 209, a wheel encoder 210, a steering motor 211, a driving motor 212, a microphone 213, a speaker 214, a steering angle encoder 215, a global positioning system (GPS) receiving unit 216, and settlement means 217.

The control unit 20 is also referred to as an electronic control unit (ECU). The control unit 20 includes a CPU 201, a memory 202, an image processing unit 203 and an interface IF1. The interface IF1 is connected with the external storage device 204, the communication unit 205, the display 206, the touch panel display 207, the camera 208, the obstacle sensor 209, the wheel encoder 210, the steering motor 211, the driving motor 212, the microphone 213, the speaker 214, the steering angle encoder 215, the GPS receiving unit 216 and the settlement means 217.

The obstacle sensor 209 is an ultrasonic sensor, a radar or the like. The obstacle sensor 209 emits an ultrasonic wave, an electromagnetic wave or the like in a detection target direction, and detects the existence, position, relative speed and others of an obstacle in the detection target direction, based on a reflected wave. Examples of the obstacle include a pedestrian, a bicycle, a structure and a building. For example, in the case where the vehicle 2 includes a box-shaped body, a plurality of obstacle sensors 209 is provided, and the plurality of obstacle sensors 209 is respectively provided at positions close to four corners of the vehicle 2, that is, a right front corner, a left front corner, a right rear corner and a left rear corner. For example, the front-rear direction and right-left direction of the vehicle 2 is decided depending on the moving direction.

The camera 208 is a photographing device with an image sensor such as a charged coupled device (CCD), a metal-oxide-semiconductor (MOS) and a complementary metal-oxide-semiconductor (CMOS). The camera 208 acquires an image at a predetermined interval called a frame period, and stores the image in a frame buffer within the control unit 20. The vehicle 2 includes a plurality of cameras 208. For example, the plurality of cameras 208 is provided on a front side surface, a rear side surface, a right side surface and a left side surface of the vehicle 2, so as to be oriented to the exterior of the vehicle 2. However, without being limited to this, some cameras 208 may be provided so as to be oriented to the interior of the vehicle 2.

The steering motor 211 controls the direction of a cross line on which a rotational plane of a wheel and a horizontal plane cross each other, that is, the angle of the wheel that is a rotational moving direction, in accordance with an instruction signal from the control unit 20. For example, the driving motor 212 drives and rotates four wheels included in the vehicle 2, in accordance with an instruction signal from the control unit 20. The driving motor 212 may drive a pair of front wheels or a pair of rear wheels.

The steering angle encoder 215 detects a steering angle that is a traveling direction of the wheel, at a predetermined detection time interval, and stores the detected steering angle in a register of the control unit 20. The steering angle is the angle of a rotational axis of the wheel in the horizontal plane. For example, an origin of the angle is set to a direction orthogonal to the rotational axis of the wheel with respect to the moving direction of the vehicle 2. Further, the wheel encoder 210 acquires the rotational angle of the wheel, at a predetermined detection time interval, and stores the detected rotational angle in a register of the control unit 20.

For example, the communication unit 205 is a communication unit that is connected with an access point of WiFi or a mobile phone base station, and that communicates with various servers on a network, through a public communication line network connected with the access point or the mobile phone base station. The communication unit 205 performs wireless communication by a wireless signal and a wireless communication system in accordance with a predetermined wireless communication standard.

The GPS receiving unit 216 receives electric waves as hour signals from a plurality of artificial satellites (global positioning satellites) that rotates around the earth, and stores the hour signals in a register of the control unit 20. The microphone 213 detects a voice, converts the voice into a digital signal, and stores the digital signal in a register of the control unit 20. The speaker 214 is driven by a D/A converter and an amplifier that are connected with the control unit 20 or a signal processing unit, and plays back an audio including a sound and a voice. The microphone 213 and the speaker 214 may include a microphone and a speaker that are provided so as to be oriented to the interior of the vehicle 2 and a microphone and a speaker that are provided so as to be oriented to the exterior of the vehicle 2.

For example, on each side surface of the body of the vehicle 2, the display 206 is provided so as to be oriented to the exterior of the vehicle 2. For example, the display 206 is a liquid crystal display, an electroluminescence panel, or the like. The touch panel display 207 is an input device for an instruction from the user, and is provided so as to be oriented to the interior of the vehicle 2, for example. However, without being limited to this, for example, the touch panel display 207 may be provided near a door of the vehicle 2, so as to be oriented to the exterior.

The CPU 201 of the control unit 20 executes a computer program expanded on the memory 202 in an executable manner, and executes a process of the control unit 20. In the memory 202, computer programs to be executed by the CPU 201, data to be processed by the CPU 201, and the like are stored. For example, the memory 202 is a dynamic random access memory (DRAM), a static random access memory (SRAM), a read only memory (ROM), or the like. In cooperation with the CPU 201, the image processing unit 203 processes the data in the frame buffer that is obtained from the camera 208 with a predetermined frame period. For example, the image processing unit 203 includes an image memory constituted by a GPU and the frame buffer. The external storage device 204 is a non-volatile storage device, and is a solid state drive (SSD) or a hard disk drive, for example.

For example, the control unit 20 acquires detection signals from sensors of units of the vehicle 2, through the interface IF1. The control unit 20 calculates a latitude and a longitude that indicate a position on the earth, based on a detection signal from the GPS receiving unit 216. Furthermore, the control unit 20 acquires map data from a map information database stored in the external storage device 204, and compares the calculated latitude and longitude with the position on the map data, to decide the current place. Further, the control unit 20 acquires a route from the current place to the destination, on the map data. Further, the control unit 20 detects the obstacle in the periphery of the vehicle 2, based on signals from the obstacle sensor 209, the camera 208 and the like, and decides the moving direction to control the steering angle, such that the obstacle is avoided.

Further, in cooperation with the image processing unit 203, the control unit 20 processes the image acquired from the camera 208 on a frame data basis, and for example, detects a change based on a difference between images, to recognize the obstacle. The control unit 20 may send the frame data of the image from the camera 208 and the voice data obtained from the microphone 213, from the communication unit 205, to the center server 1 on the network. Then, the center server 1 may perform some of analyses of the frame data of the image and the voice data.

Furthermore, the control unit 20 displays images, characters and other information on the display 206. The control unit 20 detects an operation on the touch panel display 207, and accepts an instruction from the user.

A configuration of the settlement means 217 depends on a manner of display and transfer of the product in the vehicle 2. The manner of the display and transfer of the product in the vehicle 2 is not limited to a particular manner. For example, products may be arrayed on a shelf, and the user may take a product that the user wants to purchase, from the shelf. In this case, for example, the settlement means 217 is a self-checkout system. For example, in the case where a bar code including identification information is attached to the product, the self-checkout system includes a bar code scanner, a display device that displays a list of purchased products and prices, and payment means that supports a plurality of payment methods. Examples of the payment means include cash receiving means and cash paying means for cash payment, a card reader for credit card payment, an IC card reader for electronic money payment, and a device that presents or reads a QR code for QR code payment.

The manner of the display and transfer of the product in the vehicle 2 may be, for example, a manner in which products are stored in lockers with numbers, the user designates the number of a locker containing a product that the user wants to purchase, and thereby, the user can take the product out. Further, the manner of the display and transfer of the product in the vehicle 2 may be, for example, a manner in which an image of products is displayed on a touch panel display, the user designates a product that the user wants to purchase, on the touch panel display, and thereby, the product is provided from an output port. In the case of these manners, the settlement means 217 includes a computer that controls the lockers or the touch panel display, and payment means. For example, the computer of the settlement means 217 in the manner may be the control unit 20, or may be a different computer from the control unit 20. The settlement means is not limited to the above settlement means.

Although the interface IF1 is illustrated in FIG. 2, transmission of signals between the control unit 20 and controlled objects is not limited to transmission through the interface IF1. That is, the control unit 20 may include a plurality of signal transmission paths other than the interface IF1. Further, in FIG. 2, the control unit 20 includes the single CPU 201. However, the CPU is not limited to a single processor, and may have a multiprocessor configuration. Further, a single CPU to be connected through a single socket may have a multicore configuration. At least some of the processes of the above units may be performed by a processor other than the CPU, for example, by a dedicated processor such as a digital signal processor (DSP) or a graphics processing unit (GPU). Further, at least some of the processes of the above units may be performed by an integrated circuit (IC) or another digital circuit. Further, as at least a part of the above units, an analog circuit may be included.

For maintaining the quality of the foodstuff, the vehicle 2 may include a refrigerator, a freezer, a warming drawer or the like, or may include a temperature control mechanism that controls the temperature in the vehicle 2.

Figure 3:
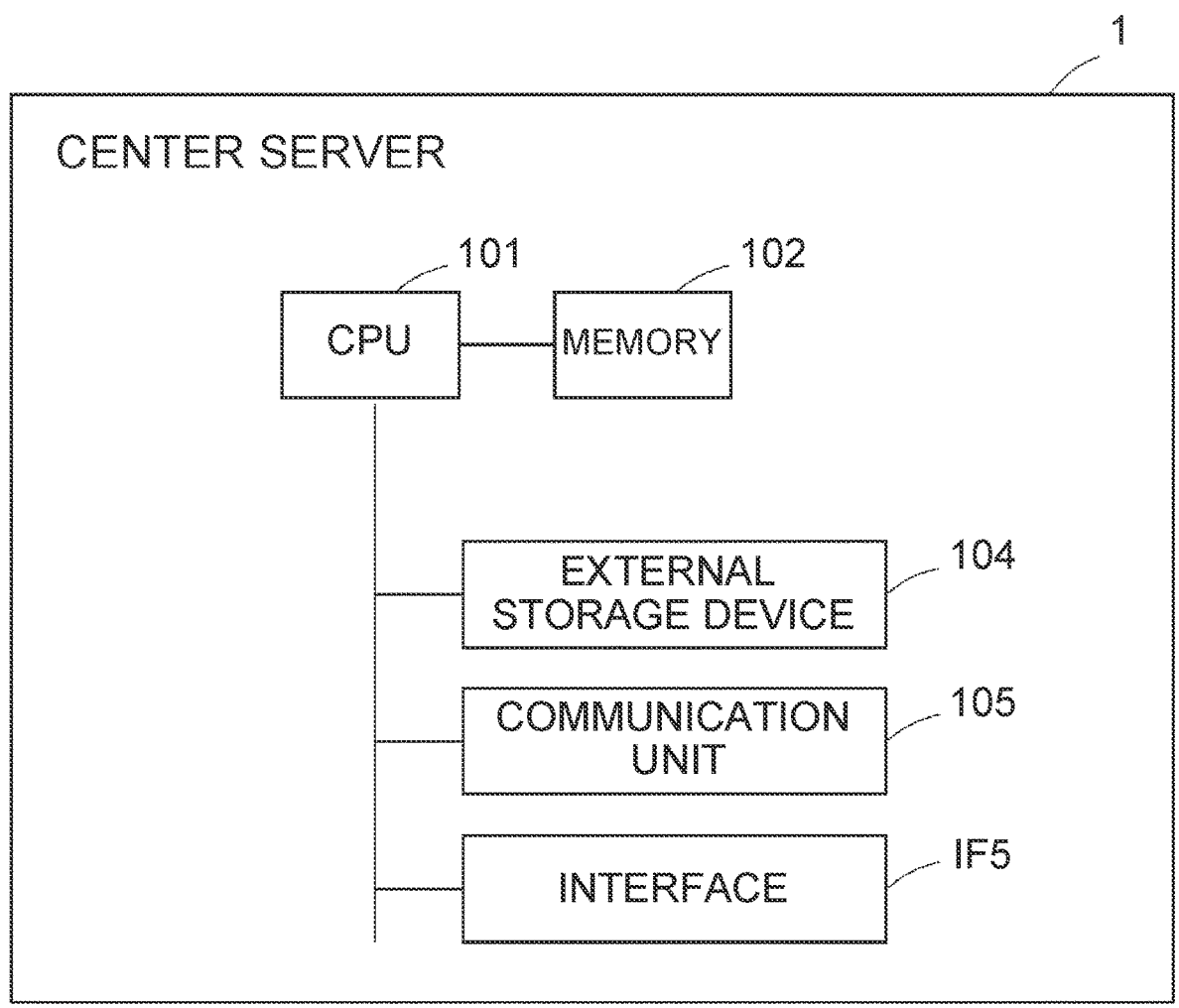
FIG. 3 is a diagram showing an example of a hardware configuration of a center server.

FIG. 3 is a diagram illustrating a hardware configuration of the center server 1. The center server 1 includes a CPU 101, a memory 102, an interface IF5, an external storage device 104 and a communication unit 105. Configurations and operations of the CPU 101, the memory 102, the interface IF5 and the external storage device 104 are the same as those of the CPU 201, the memory 202, the interface IF1 and the external storage device 204 in FIG. 2.

For example, the communication unit 105 is connected with a public communication line network through a LAN, and communicates with various servers on the network, the vehicle 2, and the like, through the public communication line network. The hardware configuration of the center server 1 is not limited to the hardware shown in FIG. 3, and addition or replacement can be appropriately performed depending on embodiments.

Figure 4:
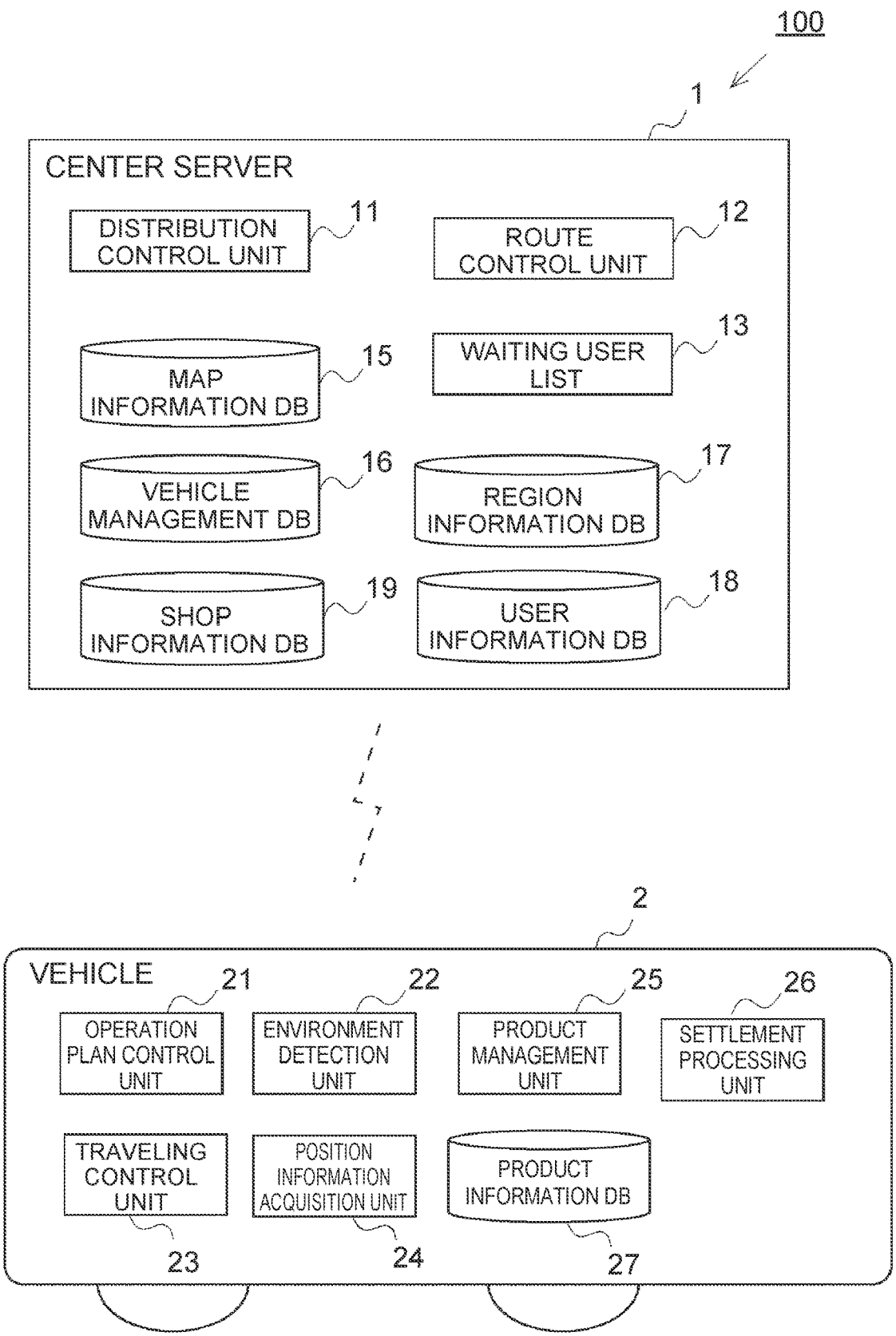
FIG. 4 is a diagram showing examples of functional configurations of the center server and the vehicle of the movable shop management system.

FIG. 4 is a diagram showing examples of functional configurations of the center server 1 and the vehicle 2 of the movable shop management system 100. The center server 1 operates as units illustrated in FIG. 4, with computer programs on the memory 102. That is, as functional constituent elements, the center server 1 includes a distribution control unit 11, a route control unit 12, a waiting user list 13, a map information database (DB) 15, a vehicle management DB 16, a region information DB 17, a user information DB 18, and a shop information DB 19.

For example, the distribution control unit 11 gives a notice of operation start of the vehicle 2, to the user terminal 3, in accordance with an instruction from the route control unit 12. For example, the instruction from the route control unit 12 is received when the start of the operation of the vehicle 2 is detected. For example, a method for giving the notice of the operation start of the vehicle 2 to the user terminal 3 is a push distribution. For example, the distribution control unit 11 may send information about the product loaded in the vehicle 2 or information about the first parking spot of the vehicle 2, to the user terminal 3, together with the notice of the operation start of the vehicle 2.

The route control unit 12 receives the position information from the vehicle 2, with the predetermined period. Further, the route control unit 12 receives a notice of the operation start from the vehicle 2, when the vehicle 2 starts the operation. Together with the notice of the operation start, from the vehicle 2, the route control unit 12 receives identification information about the vehicle 2 and the ratio of the kinds of the foodstuffs loaded in the vehicle 2, for example. In the case where the vehicle 2 is in operation, from the vehicle 2, the route control unit 12 receives the ratio of the kinds of the foodstuffs loaded in the vehicle 2, at a predetermined timing. Hereinafter, the ratio of the kinds of the foodstuffs (products) loaded in the vehicle 2 is referred to as load ratio.

When the route control unit 12 receives the notice of the operation start from the vehicle 2, the route control unit 12 executes an operation start time process. In the operation start time process, based on the load ratio of the vehicle 2, the route control unit 12 selects an initial route of the vehicle 2, gives a notice of the initial route to the vehicle 2, and instructs the distribution control unit 11 to give the notice of the operation start of the vehicle 2 to the user terminal 3.

The initial route is a route along which the vehicle 2 departs from the shop 4, goes through predetermined stop places, and returns to the shop 4. For example, a region for which it is expected that there is demand for a kind of foodstuff having the highest value in the load ratio may be extracted from regions in which the vehicle 2 associated with the shop 4 can cruise as the movable shop, and the initial route may be generated by the route control unit 12 such that the vehicle 2 cruises in the extracted region. Alternatively, a route corresponding to a kind of foodstuff having the highest value in the load ratio may be selected from routes that are previously prepared for each kind of foodstuffs. However, without being limited to this, as the initial route, a previously set route may be always used regardless of the kind of the foodstuff having the highest value in the load ratio. A range in which the vehicle 2 cruises, that is, a range of the initial route is within the region in which the vehicle 2 associated with the shop 4 can cruise as the movable shop. A generation method for the route is not limited to a particular method, and one of well-known methods may be used.

The route control unit 12 gives a notice of route information about the initial route, to the vehicle 2. For example, the route information includes the shop 4 as the destination, and includes information about parking spots in the region through which the vehicle 2 goes as the stop place, in the stop order. However, information included in the route information to be given from the center server 1 to the vehicle 2 is not limited to the above information. For example, the route information may include information about a road between stop places.

The route control unit 12 detects the operation start of the vehicle 2, for example, by the change in the position information about the vehicle 2 or the notice from the vehicle 2. When the route control unit 12 detects the operation start of the vehicle 2, the route control unit 12 executes an in-operation process. In the in-operation process, a process corresponding to the change in the load ratio of the vehicle 2 and a process for the stop-off request from the user terminal 3 are performed in parallel. Hereinafter, the process for the stop-off request from the user terminal 3 is referred to as an in-operation process 1. Hereinafter, the process corresponding to the change in the load ratio of the vehicle 2 is referred to as an in-operation process 2.

In the in-operation process 1, when the route control unit 12 receives the stop-off request from the user terminal 3, the route control unit 12 alters the route of the vehicle 2. From the user terminal 3, together with the stop-off request, the route control unit 12 receives identification information about the user terminal 3, identification information about the vehicle 2 for which the stop-off is desired, and information about a designated place for which the stop-off is desired, for example. For example, the information about the designated place for which the stop-off is desired may be an address, a latitude and longitude, a landmark or the like.

For example, the route control unit 12 adds the identification information about the user terminal 3 that is the sending source of the stop-off request, to the waiting user list 13. The waiting user list 13 is a list of users that wait for the stop-off of the vehicle 2. For example, the waiting user list 13 is held in the memory 102 of the center server 1, for each vehicle 2. For example, the waiting user list 13 includes the identification information about the user terminal 3 that is the sending source of the stop-off request, and information about a designated place, in association with each other.

When the information about the user terminal 3 is newly added to the waiting user list 13, the route control unit 12 generates a route along which the vehicle 2 goes through the place designated by the user included in the waiting user list 13 and returns to the shop 4, as the route after the alteration. For example, the route control unit 12 detects the stop-off of the vehicle 2 at the place designated by the user included in the waiting user list 13, by monitoring the position information about the vehicle 2, and removes the information about the user terminal 3 that designates the place, from the waiting user list 13.

In the in-operation process 2, in the case where the change in the load ratio of the vehicle 2 satisfies a predetermined condition, the route alteration is performed. Examples of the condition for the route alteration in the in-operation process 2 include a condition that the kind of the foodstuff having the highest value in the load ratio changes and a condition that the difference between the highest value and the lowest value in the load ratio is less than a predetermined value. However, the condition for the route alteration in the in-operation process 2 is not limited to the conditions.

For example, in the case where the condition for the route alteration is the condition that the kind of the foodstuff having the highest value in the load ratio changes, the route control unit 12 generates, as the route after the alteration, a route along which the vehicle 2 departs from the current position of the vehicle 2, goes through parking spots in a region for which it is expected that there is demand for a kind of foodstuff newly having the highest value in the load ratio, in the order from the parking spot closest to the current position of the vehicle 2, and arrives at the shop 4.

Alternatively, without being limited to the above route, the route control unit 12 may simply decide a next spot to which the vehicle 2 goes, as the route after the alteration. In this case, as the next spot to which the vehicle 2 goes, the route control unit 12 may select a parking spot that is of the parking spots in the region for which it is expected that there is demand for a kind of foodstuff newly having the highest value in the load ratio and that is closest to the current position of the vehicle 2. Further, in the case where the route control unit 12 simply decides the next spot to which the vehicle 2 goes as the route after the alteration and where the vehicle 2 has not received information about a new next spot from the center server 1 when the vehicle 2 further moves after the arrival at the decided spot, the vehicle 2 may request the information about the next spot to the center server 1, or may go to a parking place closest to the current position.

For example, in the case where the condition for the route alteration is the condition that the difference between the highest value and the lowest value in the load ratio is less than a predetermined value, the route control unit 12 may generate, as the route after the alteration, a route along which the vehicle 2 goes from the current position of the vehicle 2 through a region in which the vehicle 2 has not cruised and arrives at the shop 4. Alternatively, without being limited to the above route, the route control unit 12 may simply decide a next spot to which the vehicle 2 goes, as the route after the alteration. In this case, as the next spot to which the vehicle 2 goes, the route control unit 12 may select a parking spot that is of parking spots to which the vehicle 2 has not cruised and that is closest to the vehicle 2.

The in-operation process 1 and the in-operation process 2 can be executed in parallel. However, in the first embodiment, the in-operation process 1 is preferentially executed. That is, in the first embodiment, in the case where the waiting user list 13 is null, the route alteration in the in-operation process 2 is performed. In the case where the waiting user list 13 is not null, the vehicle 2 goes preferentially to the place designated by the user terminal 3 that is the sending source of the stop-off request, and the control is performed such that the route alteration in the in-operation process 2 is not performed.

Each of the map information DB 15, the vehicle management DB 16, the region information DB 17, the user information DB 18 and the shop information DB 19 is created in the external storage device 104 of the center server 1. For example, each of the map information DB 15, the vehicle management DB 16, the region information DB 17, the user information DB 18 and the shop information DB 19 is a relational database.

For example, the map information DB 15 includes map information about an area to be managed by the center server 1, information relevant to each region, and information about previously set parking spots of the vehicle 2. For example, the information relevant to the region includes identification information about the region and information about the range of the region. For example, the region may be a zone that is set in a unit of chome or the like of the address, or may be a zone that is uniquely set by the movable shop management system 100. In the case where the zone is uniquely set by the movable shop management system 100, for example, the area to be managed by the center server 1 may be divided into equal zones, and one of the equal zones may be set as the region. Alternatively, one region may be set such that the number of households is nearly equal. For example, the parking spot of the vehicle 2 is a parking place that is rend by the shop 4 or is permitted to be used. For example, the information about the parking spot of the vehicle 2 may be the address, the latitude and longitude, or the like.

The vehicle management DB 16 holds information relevant to the vehicle 2. In the region information DB 17, characteristics of users that live in each region are stored. In the user information DB 18, information relevant to the user is stored. In the shop information DB 19, information relevant to the shop 4 is stored. Details of the information to be held in the vehicle management DB 16, the region information DB 17, the user information DB 18 and the shop information DB 19 will be described later.

Some of the functional constituent elements of the center server 1 or some of the processes in the center server 1 may be executed by another computer that is connected with the network. Further, a series of processes to be executed in the center server 1 may be executed by hardware, or may be executed by software.

Next, the vehicle 2 operates as units illustrated in FIG. 4, with computer programs on the memory. For example, as functional constituent elements, the vehicle 2 includes an operation plan control unit 21, an environment detection unit 22, a traveling control unit 23, a position information acquisition unit 24, a product management unit 25, a settlement processing unit 26, and a product information DB 27. The operation plan control unit 21, the environment detection unit 22, the traveling control unit 23, the position information acquisition unit 24, the product management unit 25, the settlement processing unit 26 and the product information DB 27 are functional constituent elements that are achieved, for example, when the CPU 201 executes programs on the memory 202.

For example, the position information acquisition unit 24 acquires the position information about the vehicle 2 that is acquired by the GPS receiving unit 216 or the like, with a predetermined period, and sends the position information to the center server 1. For example, the position information about the vehicle 2 indicates the latitude and longitude. Alternatively, for example, the position information about the vehicle 2 indicates the address. For example, the position information about the vehicle 2 that is acquired by the position information acquisition unit 24 is output to the operation plan control unit 21 and the traveling control unit 23.

The operation plan control unit 21 receives the operation command from the center server 1. Together with the operation command, the operation plan control unit 21 receives the route information. For example, the route information to be received from the center server 1 includes the stop place (the parking spot of the vehicle 2) and information about the stop place and the destination (the shop 4). The operation plan control unit 21 calculates the route along which the vehicle 2 should move, and generates the operation plan, based on the operation command and the position information about the vehicle 2 that is obtained by the position information acquisition unit 24. The route to be generated by the operation plan control unit 21 is a more specific route information including also information about the road between stop places designated by the route information that is received from the center server 1. In the case where the route information to be received from the center server 1 includes detailed information about the road between the stop places, the operation plan control unit 21 does not generated the specific route.

The operation plan includes data relevant to the thus calculated route along which the vehicle 2 travels, and data specifying processes that the vehicle 2 should perform on a part or a whole of the route. Examples of the processes that the vehicle 2 should perform include the parking of the vehicle 2 for a predetermined period. The operation plan control unit 21 outputs the generated operation plan to the traveling control unit 23.

The environment detection unit 22 detects environmental information about the periphery of the vehicle 2 that is used for the autonomous traveling, based on data acquired by various sensors that are mounted on the vehicle 2. Examples of the object to be detected by the environment detection unit 22 include the number and positions of lanes, the number and positions of vehicles existing in the periphery of the vehicle 2, the number and positions of obstacles (for example, pedestrians, bicycles, structures and buildings) existing in the periphery of the vehicle 2, the structure of the road, and traffic signs. However, the object to be detected by the environment detection unit 22 is not limited to them. Any object may be detected if the object is used for the autonomous traveling. For example, in the case where the sensor is a stereo camera, the detection of a physical object in the periphery of the vehicle 2 is performed by image processing of image data picked up by the stereo camera. Data that is relevant to peripheral environment of the vehicle 2 and that is detected by the environment detection unit 22 is output to the traveling control unit 23 described later.

For example, the traveling control unit 23 generates a control command for controlling the autonomous traveling of the vehicle 2, based on the operation plan that is generated by the operation plan control unit 21, the data that is relevant to the peripheral environment of the vehicle 2 and that is generated by the environment detection unit 22, and the position information about the vehicle 2 that is acquired by the position information acquisition unit 24. For example, when the operation plan is input from the operation plan control unit 21, the traveling control unit 23 determines whether the obstacle exists in a movement direction shown in the operation plan, and secures safety of movement. In the case where the obstacle does not exist in the movement direction, the traveling control unit 23 generates the control command such that the vehicle 2 travels along the route in accordance with the operation plan. The generated control command is sent to the driving motor 212. As a generation method for the control command for the autonomous traveling of the vehicle, a known method can be employed.

The product management unit 25 manages the product loaded in the vehicle 2. For example, a predetermined bar code reader related to the vehicle 2 reads a bar code attached to the product, and thereby, the registration of the product in the vehicle 2 is performed. The product identification information read by the bar code reader is sent to a server that manages the product in the shop 4, and a product registration request and information relevant to the product are sent from the server to the vehicle 2. When the product management unit 25 receives the product registration request and the information relevant to the product from the server that manages the product in the shop 4, the product management unit 25 registers information relevant to the product, in the product information DB 27. For example, the information relevant to the product includes the identification information, kind, regular price, expiration date and others of the product.

The product management unit 25 calculates the load ratio of the vehicle 2 at a predetermined timing, and sends the load ratio to the center server 1. For example, the timing of the calculation of the load ratio is a timing when an operation start instruction is input by a user operation through the touch panel display 207, or a timing when a variation in stock quantity occurs due to the purchase of the product or the expiration. For example, in the case where the operation start instruction is input by the user operation through the touch panel display 207, the product management unit 25 sends the load ratio to the center server 1, together with an operation start notice.

Further, with a predetermined period, the product management unit 25 updates the price for each product, based on the remaining time before the expiration date. For example, a relation between the remaining time before the expiration date and discount rate is previously set, and based on the relation, the product management unit 25 updates the price of the product. The relation between the remaining time before the expiration date and the discount rate is set, for example, such that the discount rate is higher as the remaining time before the expiration date is shorter.

The settlement processing unit 26 performs a calculation process for a purchase amount of purchased products, a settlement process for the purchased products, and the like. For example, the settlement processing unit 26 receives the identification information about the purchased products from the settlement means 217, acquires the prices of the purchased products from the product information DB 27 described later, and calculates the purchase amount by summing the prices of the purchased products. The settlement processing unit 26 performs the settlement process depending on the settlement method designated by the user. In the case of cash payment, the settlement processing unit 26 controls the cash receiving means and the cash paying means. In the case of credit card payment, the settlement processing unit 26 performs the settlement process by using the credit card information input from the card reader and communicating with a server of the corresponding credit card company. In the case of electronic money payment, the settlement processing unit 26 subtracts the purchase amount from an amount charged in an IC card that is input from an IC card scanner, and causes the IC card scanner to write the amount after the subtraction in the IC card. The process by the settlement processing unit 26 is not limited to the processes, and is appropriately altered depending on the manner of the display and transfer of the product in the vehicle 2 and the manner of payment.

For example, the product information DB 27 is generated in the external storage device 204 of the vehicle 2. In the product information DB 27, information relevant to the product loaded in the vehicle 2 is stored. Details of the information stored in the product information DB 27 will be described later.

Some of the functional constituent elements of the vehicle 2 or some of the processes in the vehicle 2 may be executed by another computer that is connected with the network. Further, a series of processes to be executed in the vehicle 2 may be executed by hardware, or may be executed by software. For example, the product information DB 27 does not need to be included in the vehicle 2, and the vehicle 2 may acquire the information relevant to the product, from the product information DB 27 that is held in another server.

FIG. 5 is an example of a vehicle information management table. The vehicle information management table is a table that is held in the vehicle management DB 16 of the center server 1. In the vehicle information management table, the information relevant to the vehicle 2 is stored. In the example shown in FIG. 5, the vehicle information management table includes fields of vehicle ID, shop ID, service state and position information.

In the field of the vehicle ID, the identification information about the vehicle 2 is stored. As the identification information about the vehicle 2, the identification information given by the movable shop management system 100 may be used, or information written on a number plate may be used. In the shop ID field, the identification information about the shop 4 that is associated with the vehicle 2 is stored.

In the field of the service state, information indicating a state of the vehicle 2 is stored. Examples of the state of the vehicle 2 include "standby" indicating that the vehicle 2 is standing by and "cruising" indicating that the vehicle 2 is cruising. In the field of the service state, for example, a code, a flag or the like corresponding to each state is stored, as the information indicating the state of the vehicle 2. In FIG. 5, for convenience, a word indicating the state of the vehicle 2 is stored in the field of the service state.

In the field of the position information, the position information about the vehicle 2 is stored. For example, the position information about the vehicle 2 is received from the vehicle 2 with a predetermined period, and is updated to the latest position information each time. The vehicle information management table is managed by the route control unit 12, and the values of the fields are also updated by the route control unit 12. The configuration of the vehicle information management table is not limited to the configuration shown in FIG. 5. Further, the information to be stored in the vehicle management DB 16 is not limited to the information in the vehicle information management table.

FIG. 6 is an example of a shop information management table. The shop information management table is held in the shop information DB 19 of the center server 1. The shop information management table is a table that holds information about a region that is targeted by the shop 4 as a region for the cruise of the vehicle 2. The shop information management table is previously set by an administrator of the movable shop management system 100.

In the example shown in FIG. 6, fields of shop ID and target region are included in the shop information management table. In the field of the shop ID, the identification information about the shop 4 is stored. In the field of the target region, identification information about the region that is targeted by the shop 4 as the region for the cruise of the vehicle 2 is stored. In the case where there is a plurality of regions that are targeted by the shop 4 as the region for the cruise of the vehicle 2, the identification information about the plurality of regions is stored in the field of the target region. The configuration of the shop information management table is not limited to the configuration shown in FIG. 6. Further, the information to be stored in the shop information DB 19 is not limited to the information in the shop information management table.

FIG. 7 is an example of a user information management table. The user information management table is stored in the user information DB 18 of the center server 1. In the user information management table, information relevant to the user that is registered in the service of the movable shop management system 100 is stored. Fields of user ID, shop ID, sex, region ID and family structure are included in the user information management table shown in FIG. 7.

In the field of the user ID, identification information about the user is stored. For example, the identification information about the user may be identification information that is given to the user by the movable shop management system 100, a login name that is designated by the user, or the like. The identification information about the user does not overlap with the identification information about another user.

In the field of the shop ID, the identification information about the shop 4 designated by the user is stored. For example, in many cases, a shop to which the user frequently comes is designated. A plurality of shops may be designated by the user. In this case, a plurality of pieces of identification information about the shops is stored in the field of the shop ID.

In the field of the sex, information indicating the sex of the user is stored. For example, the information indicating the sex may be a code or a flag corresponding to the sex. In FIG. 7, for convenience, a word indicating the sex such as "female" or "male" is stored. In the fields of the region ID, identification information about a resident region of the user that is designated by the user is stored.

In the field of the family structure, information indicating the family structure of the user is stored. For example, the family structure of the user is indicated by information such as the number of adults, the number of children, unmarried members, married members or the like. For example, the information indicating the family structure may be a code or a flag corresponding to the number of adults, the number of children, unmarried members, married members or the like. In FIG. 7, for convenience, words indicating the family structure are stored in the field of the family structure.

For example, the user information management table is managed by the distribution control unit 11. For example, when a registration request and the like for the user information is received from the user terminal 3, information about the corresponding user in the user information management table is updated to information designated together with the registration request. The configuration of the user information management table is not limited to the configuration shown in FIG. 7. Further, the information to be stored in the user information DB 18 is not limited to the information in the user information management table.

FIG. 8 is an example of a region information management table. The region information management table is stored in the region information DB 17 of the center server 1. The region information management table is a table that holds the characteristic of residents in each region. Fields of region ID and classification are included in the region information management table shown in FIG. 8.

In the field of the region ID, the identification information about the region is stored. In the field of the classification, information indicating a class based on the characteristic of the residents in the region is stored. Examples of the class include "single-person household", "family" and "the number of households is small". For example, a code or a flag corresponding to the class is stored in the field of the classification. In FIG. 8, for convenience, the name of the class is stored. For example, the classification of the region is stored in the user information management table. The classification of the region may be performed based on statistics of the values of the fields of the region and the family structure, or may be performed based on a research result or the like that is released by a public institution.

For example, the region information management table is managed by the route control unit 12. For example, the region information management table may be updated on a weekly or monthly basis. The information to be stored in the region information management table is not limited to the information shown in FIG. 8. Further, the information to be stored in the region information DB 17 is not limited to the region information management table.

FIG. 9 is an example of a product information management table. The product information management table is stored in the product information DB 27 of the vehicle 2. The product information management table is a table that holds the information relevant to the product loaded in the vehicle 2. In the example shown in FIG. 9, fields of product ID, kind, expiration date, regular price, discount price and purchase are included in the product information management table.

In the field of the product ID, the identification information about the product is stored. In the field of the kind, information indicating the kind of the product is stored. Examples of the kind of the product include bread, daily dish and fresh food. However, the kind of the product is not limited to them. The kind of the product is previously decided. For example, a code or a flag corresponding to the kind is stored in the field of the kind. In FIG. 9, for convenience, the name of the kind is stored in the field of the kind.

In the field of the expiration date, the expiration date of the product is stored. For example, the expiration date is described as year-month-day, year-month-day-hour, or year-month-day-hour-minute. In the field of the regular price, the value of the regular price of the product is stored. In the field of the discount price, a price after discount is stored. In the field of the purchase, information indicating whether the product has been purchased is stored. For example, a flag indicating whether the product has been purchased is stored in the field of the purchase. In FIG. 9, for convenience, words ("not purchased", "purchased" and the like) indicating whether the product has been purchased are stored in the field of the purchase. The initial value of the purchase field is information ("not purchased" in FIG. 9) indicating that the product has not been purchased yet.

For example, the information of the fields of the product ID, the kind, the expiration date and the regular price in the product information management table is acquired from a server in the shop 4. The information of the fields of the discount price and the purchase is managed by the product management unit 25. The field of the discount price does not need to be provided. In this case, for example, the discount price may be calculated when the product is purchased. The configuration of the product information management table is not limited to the configuration shown in FIG. 9. The information stored in the product information DB is not limited to the product information management table.

Processing Flow

Figure 10:
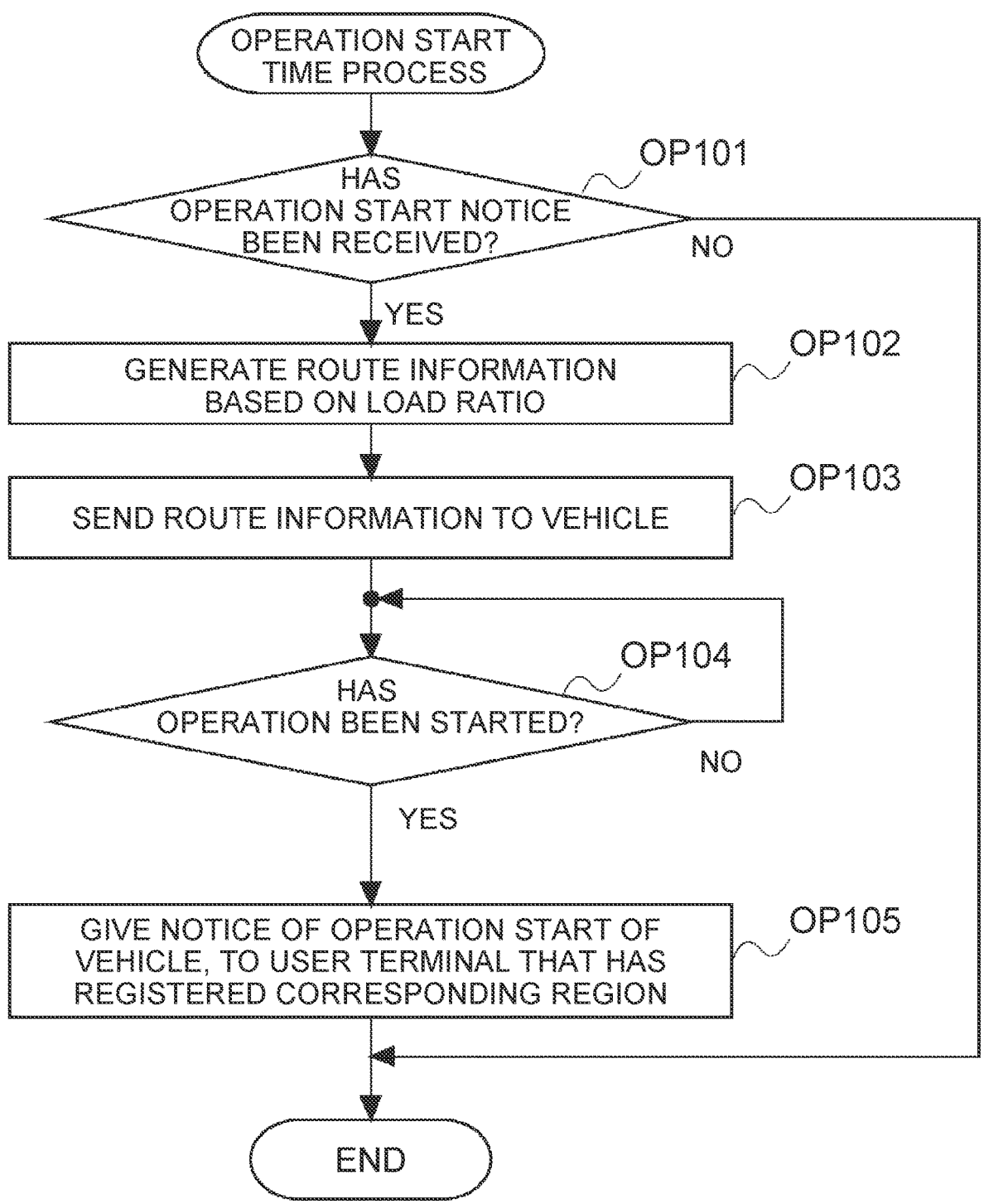
FIG. 10 is an example of a flowchart of an operation start time process for the vehicle by the center server.

FIG. 10 is an example of a flowchart of the operation start time process for the vehicle 2 by the center server 1. For example, the process shown in FIG. 10 is repeatedly executed with a predetermined period. The process shown in FIG. 10 is executed by the CPU 101 of the center server 1. However, for convenience, the process will be described assuming that the process is executed by the route control unit 12 that is a functional constituent element. The same goes for flowcharts for the center server 1 other than FIG. 10.

In OP101, the route control unit 12 determines whether the operation start notice has been received from the vehicle 2. For example, the identification information about the vehicle 2 and the load ratio are received together with the operation start notice. In the case where the operation start notice has been received from the vehicle 2 (OP101: YES), the process proceeds to OP102. In the case where the operation start notice has not been received from the vehicle 2 (OP101: NO), the process shown in FIG. 10 ends. For example, the load ratio received together with the operation start notice is held in the memory 102, and thereafter, is overwritten whenever the load ratio is received. Hereinafter, in the description with FIG. 10, the vehicle 2 means the vehicle 2 that is the sending source of the operation start notice.

In OP102, the route control unit 12 generates the route information about the initial route of the vehicle 2, based on the load ratio of the vehicle 2. For example, the route control unit 12 extracts a region for which it is expected that there is demand for a kind of foodstuff having the highest value in the load ratio, from the target regions of the shop 4 associated with the vehicle 2, sets parking spots in the extracted region as the stop place, decides the stop order, and generates the route information about the initial route. The shop 4 associated with the vehicle 2 is identified from the vehicle information DB 16. The target regions of the shop 4 are identified from the shop information DB 19. For example, the region for which it is expected that there is demand for a predetermined kind of foodstuff may be decided from a previously set association between the kind of the foodstuff and the characteristic (the single-person household, the family or the like) of the region, and the region information DB 17, or may be predicted from the information (the position information, the stop-off request to another vehicle 2, or the like) about the user that is acquired through an application at that time. The information about the parking spot in the region is acquired from the map information DB 15.

In OP103, the route control unit 12 sends the route information about the initial route to the vehicle 2, together with the operation command. In OP104, the route control unit 12 determines whether the vehicle 2 has started the operation. For example, the route control unit 12 detects that the vehicle 2 has started the operation, by detecting the change in the position information about the vehicle 2 or by receiving the notice of the start of the operation from the vehicle 2. In the case where it is detected that the vehicle 2 has started the operation (OP104: YES), the process proceeds to OP105. Until it is detected that the vehicle 2 has started the operation (OP104: NO), the route control unit 12 waits.

In OP105, the route control unit 12 sends the notice of the operation start of the vehicle 2, to the user terminal 3 of the user that has registered the target region of the shop 4 associated with the vehicle 2. Thereafter, the process shown in FIG. 10 ends.

Figure 11:
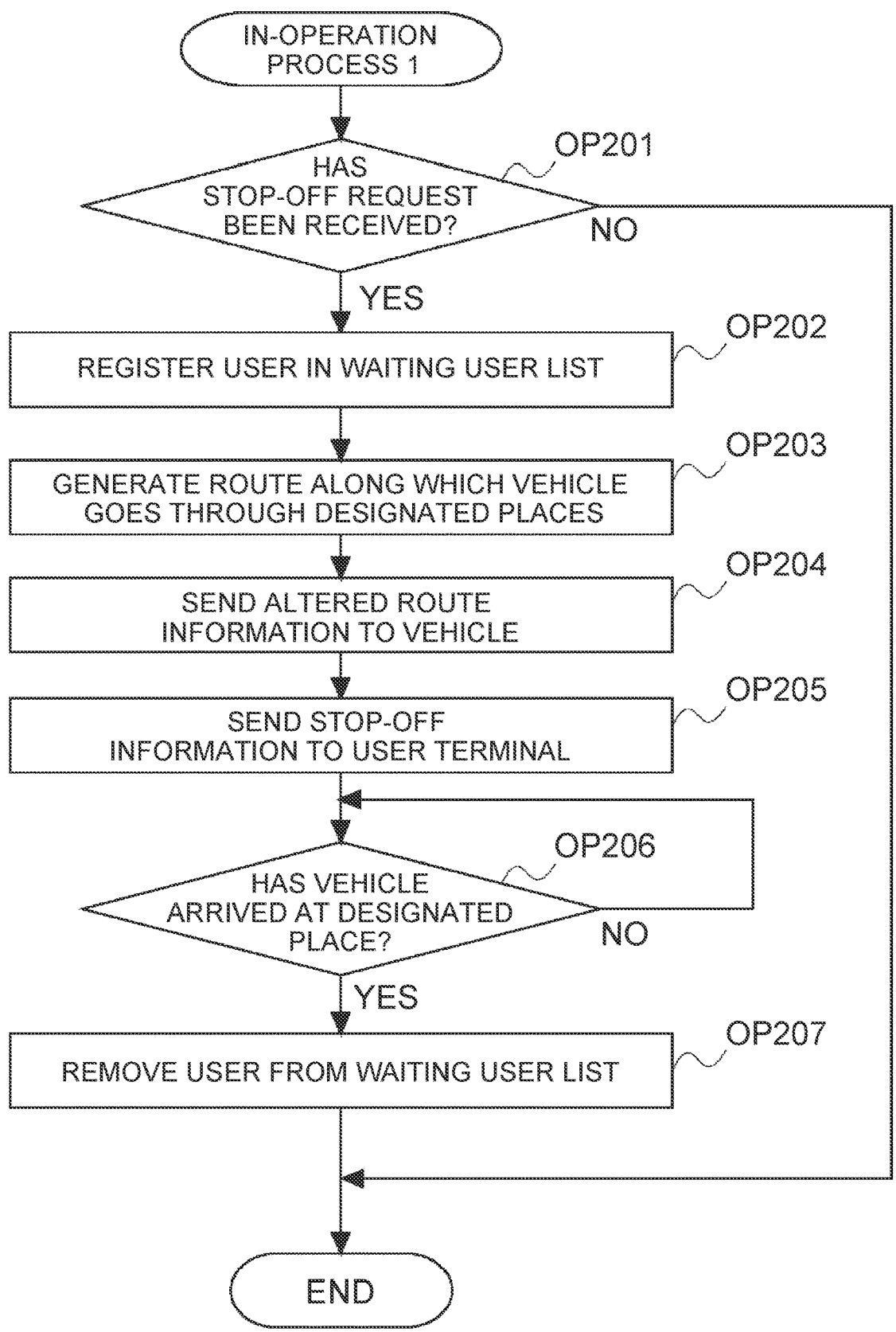
FIG. 11 is an example of a flowchart of an in-operation process 1 for the vehicle by the center server.

FIG. 11 is an example of a flowchart of the in-operation process 1 for the vehicle 2 by the center server 1. The process shown in FIG. 11 is repeatedly executed after the operation start of the vehicle 2 is detected and before the operation end is detected. For example, the operation start and operation end of the vehicle 2 is detected based on the position information about the vehicle 2 or the notice from the vehicle 2. The detection of the operation start and operation end of the vehicle 2 is performed by the route control unit 12. The start of the process in FIG. 11 may be triggered by completion of the operation start time process shown in FIG. 10.

In OP201, the route control unit 12 determines whether the stop-off request has been received from the user terminal 3. For example, the identification information about the user of the user terminal 3, the identification information about the vehicle 2 for which the stop-off is desired, and the designated place for which the stop-off is desired are received together with the stop-off request. In the case where the stop-off request has been received from the user terminal 3 (OP201: YES), the process proceeds to OP202. In the case where the stop-off request has not been received from the user terminal 3 (OP201: NO), the process shown in FIG. 11 ends. Hereinafter, in the description with FIG. 11, the user terminal 3 means the user terminal 3 that is the sending source of the stop-off request.

In OP202, the route control unit 12 registers the identification information about the user of the user terminal 3, in the waiting user list of the vehicle 2 for which the stop-off request is desired. On this occasion, in the case where another user has been registered in the waiting user list, the information about the user is registered in the waiting user list, in the stop order, and therefore, the information about the user of the user terminal 3 is registered at the position in the list that corresponds to a relation between the place designated by the other user and the place designated by the user of the user terminal 3. Hereinafter, in the description with FIG. 11, the vehicle 2 means the vehicle 2 that is the object of the stop-off request received in OP201.

In OP203, the route control unit 12 generates a route information in which the vehicle 2 goes through places designated by the users registered in the waiting user list and returns to the shop 4. In OP204, the route control unit 12 sends the generated route information to the vehicle 2. The vehicle 2 receives the route information from the center server 1, and alters the route based on the received route information.

In OP205, the route control unit 12 sends stop-off information to the user terminal 3, in response to the stop-off request. The stop-off information includes information relevant to a schedule of the stop-off at the place designated by the user terminal 3. Examples of the information relevant to the schedule of the stop-off include the order of the stop-off at the place designated by the user terminal 3 and a scheduled hour of the stop-off.

In OP206, the route control unit 12 determines whether the vehicle 2 has arrived at the place designated by the user terminal 3. The detection of the arrival of the vehicle 2 at the place designated by the user terminal 3 is performed, for example, based on the position information about the vehicle 2 or a completion report from the user terminal 3. Until the vehicle 2 arrives at the place designated by the user terminal 3 (OP206: NO), the process of OP206 is repeated, and the process in FIG. 11 waits. In the case where it is detected that the vehicle 2 has arrived at the place designated by the user terminal 3 (OP206: YES), the process proceeds to OP207.

In OP207, the route control unit 12 removes the information about the user of the user terminal 3, from the waiting user list. Thereafter, the process shown in FIG. 11 ends.

Figure 12:
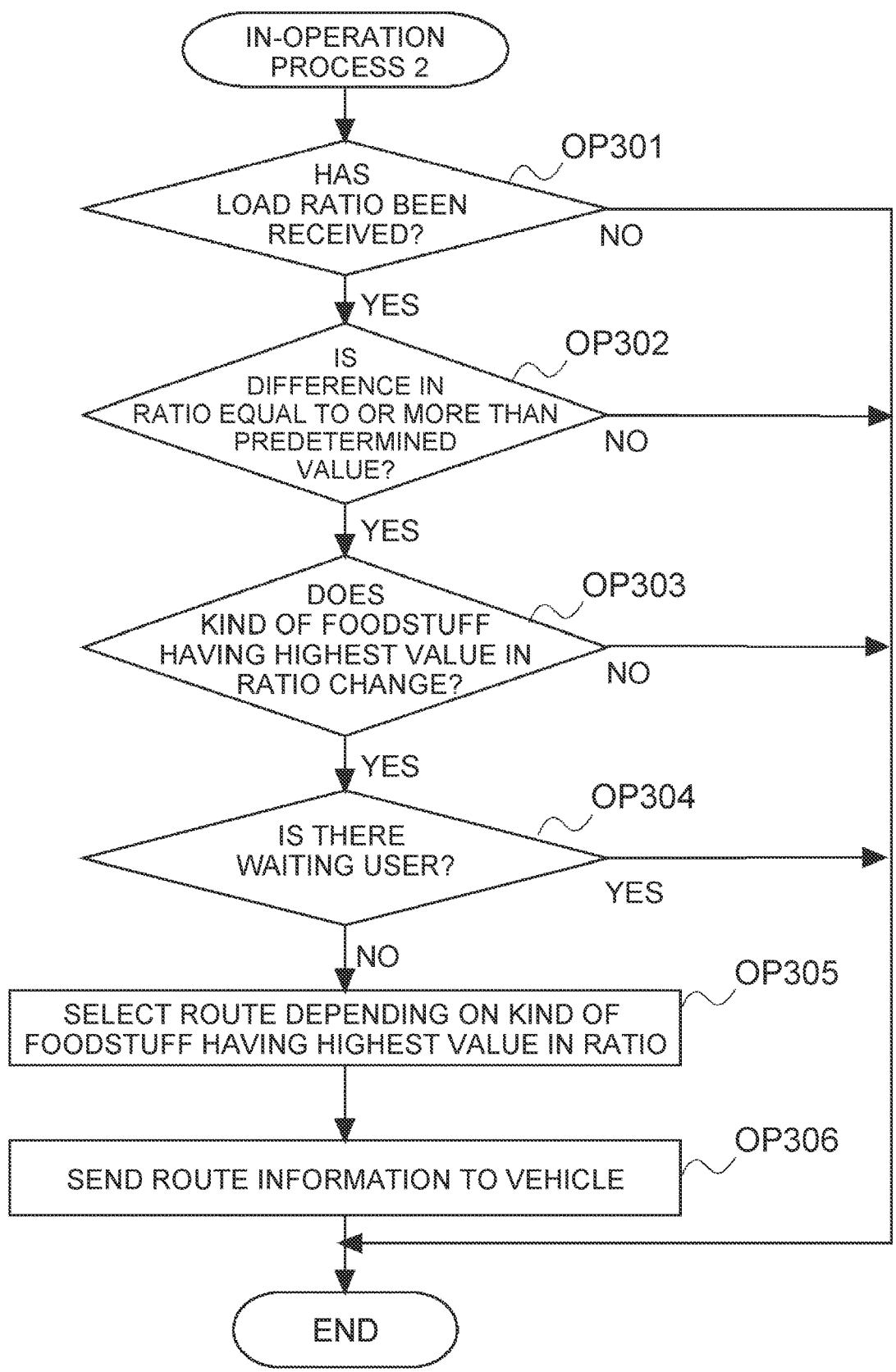
FIG. 12 is an example of a flowchart of an in-operation process 2 for the vehicle by the center server.

FIG. 12 is an example of a flowchart of the in-operation process 2 for the vehicle 2 by the center server 1. The process shown in FIG. 12 is repeatedly executed after the operation start of the vehicle 2 is detected and before the operation end is detected. The start of the process in FIG. 12 may be triggered by completion of the operation start time process shown in FIG. 10. In the example shown in FIG. 12, the condition for the route alteration is the condition that the difference between the highest value and the lowest value in the load ratio of the vehicle 2 is less than a predetermined value and the kind of the foodstuff having the highest value in the load ratio changes.

In OP301, the route control unit 12 determines whether the notice of the load ratio has been received from the vehicle 2. In the case where the notice of the load ratio has been received from the vehicle 2 (OP301: YES), the process proceeds to OP302. In the case where the notice of the load ratio has not been received from the vehicle 2 (OP301: NO), the process shown in FIG. 12 ends. Hereinafter, in the description with FIG. 12, the vehicle 2 means the vehicle 2 that is the sending source of the notice of the load ratio.

In OP302, the route control unit 12 determines whether the difference between the highest value and the lowest value in the load ratio is equal to or more than the predetermined value. In the case where the difference between the highest value and the lowest value in the load ratio is less than the predetermined value (OP302: NO), the amounts of all kinds of loaded foodstuffs are nearly equal, and the process shown in FIG. 12 ends without the alteration of the route of the vehicle 2. In the case where the difference between the highest value and the lowest value in the load ratio is equal to or more than the predetermined value (OP302: YES), the process proceeds to OP303.

In OP303, the route control unit 12 determines whether the kind of the foodstuff having the highest value in the load ratio changes. The load ratio received at the last time is held in the memory 102. In the case where the kind of the foodstuff having the highest value in the load ratio changes (OP303: YES), the process proceeds to OP304. In the case where the kind of the foodstuff having the highest value in the load ratio does not change (OP303: NO), the process shown in FIG. 12 ends without the alteration of the route of the vehicle 2.

In OP304, the route control unit 12 refers to the waiting user list of the vehicle 2, and determines whether there is a waiting user. In the case where the waiting user list is null, the route control unit 12 determines that there is no waiting user (OP304: NO), and the process proceeds to OP305. In the case where the waiting user list is not null, the route control unit 12 determines that there is a waiting user (OP304: YES). In this case, the stop-off at the place designated by the waiting user is preferentially performed, and therefore, the route is not altered in the in-operation process 2. Thereafter, the process shown in FIG. 12 ends.

In OP305, the route control unit 12 generates the route information about the vehicle 2, such that the vehicle 2 goes to a region for which it is expected that there is demand for a kind of foodstuff having the highest value in the load ratio. In OP306, the route control unit 12 sends the route information generated in OP305, to the vehicle 2. The route control unit 12 may send only the information about the next stop place, to the vehicle 2. Thereafter, the process shown in FIG. 12 ends.

Each of the processes by the center server 1 shown in FIG. 10 to FIG. 12 is an example, and the operation start time process, the in-operation process 1 and the in-operation process 2 are not limited to the processes shown in FIG. 10 to FIG. 12. For example, the in-operation process 2 is appropriately altered depending on the content of the condition for the route alteration.

Figure 13:
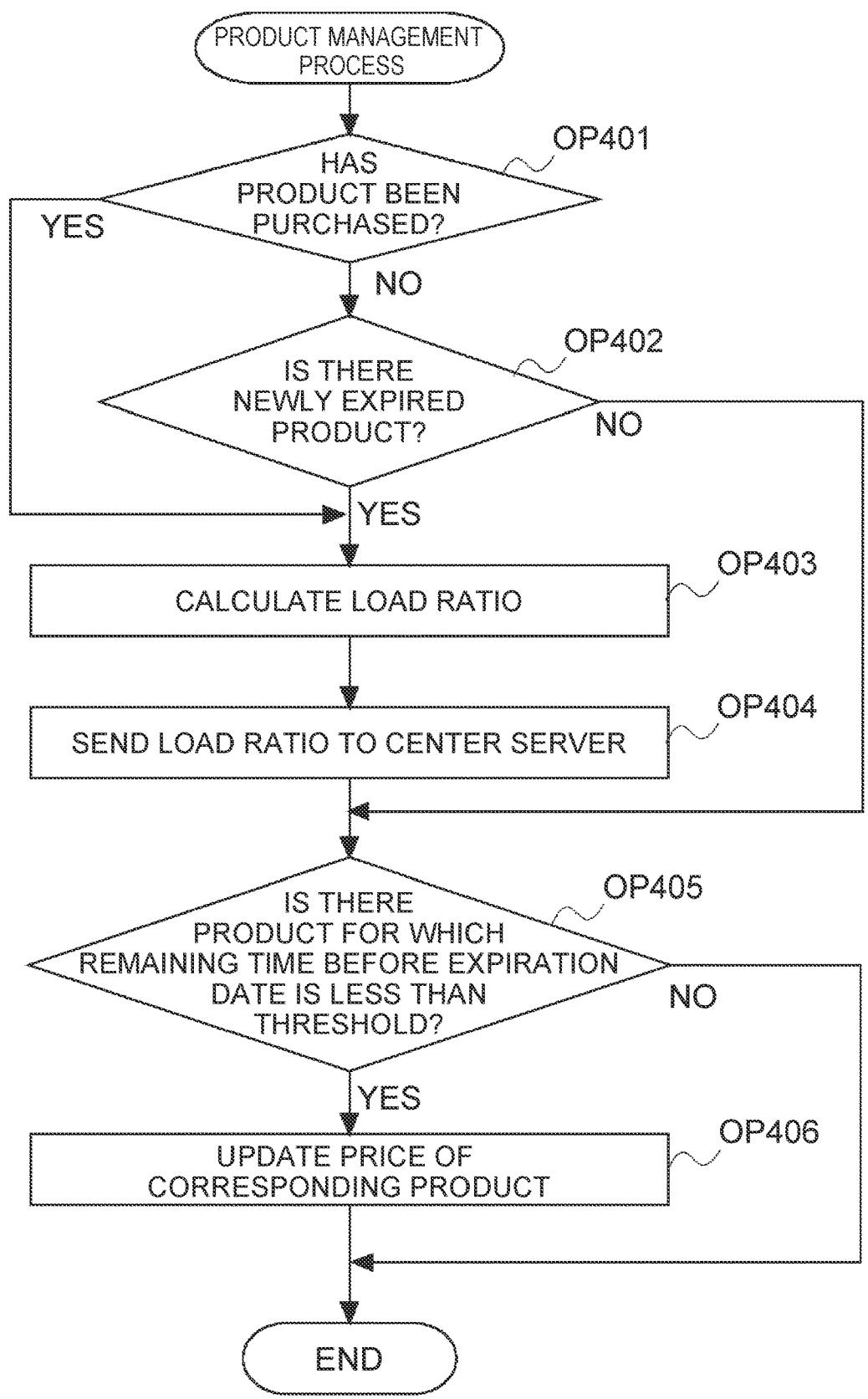
FIG. 13 is an example of a flowchart of a product management process by the vehicle.

FIG. 13 is an example of a flowchart of a product management process by the vehicle 2. The process shown in FIG. 13 is repeatedly executed during the operation of the vehicle 2. The process shown in FIG. 13 is executed by the control unit 20 of the vehicle 2. However, for convenience, the process will be described assuming that the process is executed by the product management unit 25 that is a functional constituent element.

In OP401, the product management unit 25 determines whether the product has been purchased. In the case where the product has been purchased (OP401: YES), the process proceeds to OP403. In this case, the product management unit 25 updates the value of the purchase field of the product information management table for the purchased product, to information indicating the purchase. In the case where the product has not been purchased (OP401: NO), the process proceeds to OP402.

In OP402, the product management unit 25 determines whether there is a newly expired product. In the case where there is a newly expired product (OP402: YES), the process proceeds to OP403. In the case where there is no newly expired product (OP402: NO), the process proceeds to OP405.

In OP403, the product management unit 25 performs recalculation of the load ratio. In the recalculation of the load ratio, the expired product is excluded. In OP404, the product management unit 25 sends the load ratio to the center server 1. When the load ratio is received, the in-operation process 2 is performed in the center server 1.

In OP405, the product management unit 25 determines whether there is a product for which the remaining time before the expiration date is less than a predetermined threshold. For example, the threshold of the remaining time before the expiration date is set in units of one hour, 30 minutes or 15 minutes. In the case where there is a product for which the remaining time before the expiration date is less than the predetermined threshold (OP405: YES), the process proceeds to OP406. In the case where there is no product for which the remaining time before the expiration date is less than the predetermined threshold (OP405: NO), the process shown in FIG. 13 ends.

In OP406, the product management unit 25 updates the price of the corresponding product. For example, the product management unit 25 updates the price of the corresponding product, to a previously set final price. For example, the product management unit 25 updates the value of the price field of the product information management table for the corresponding product. Thereafter, the process shown in FIG. 13 ends.

The product management process by the vehicle 2 is not limited to the process shown in FIG. 13. Further, the process by the vehicle 2 is not limited to the product management process.

Figure 14:
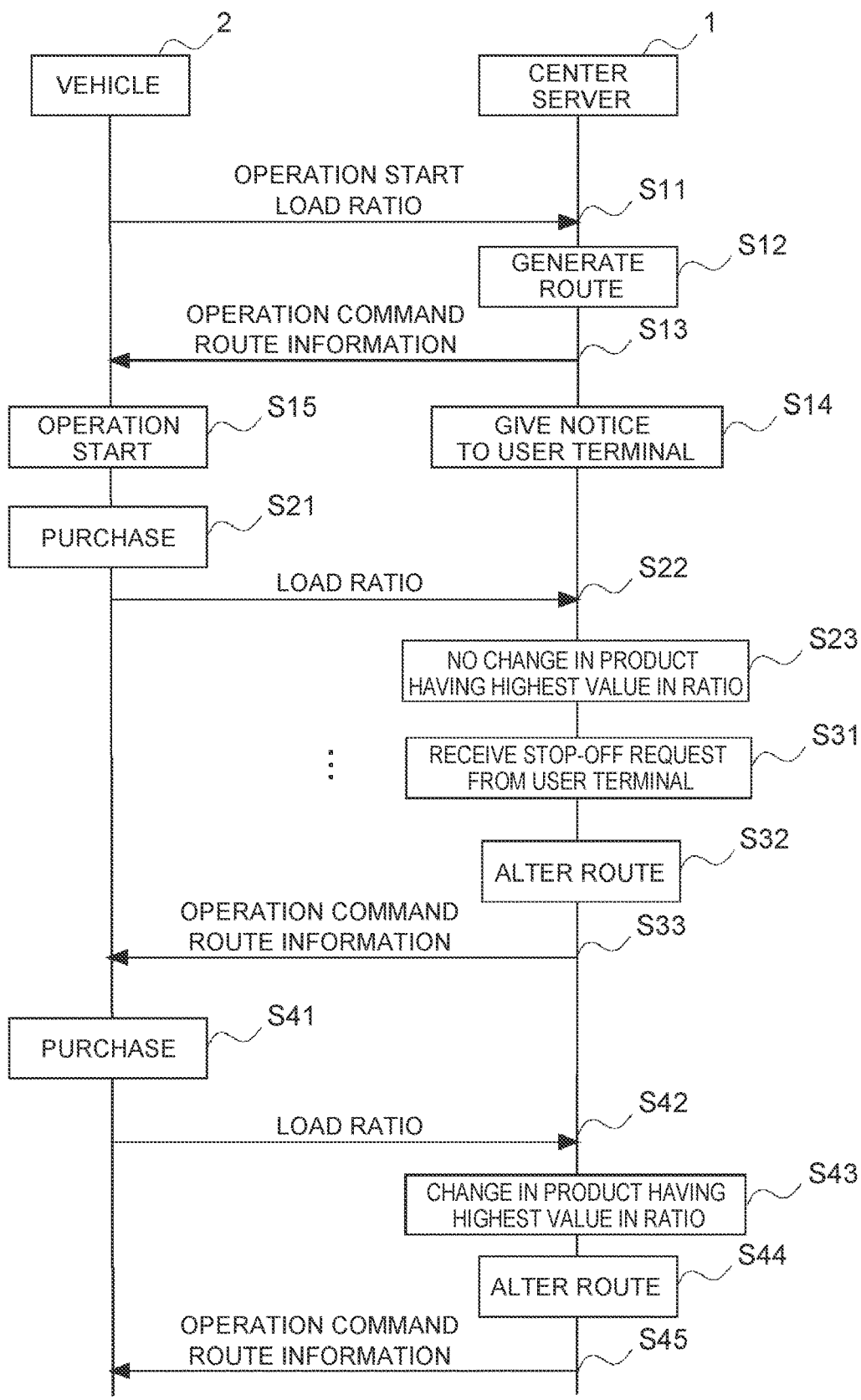
FIG. 14 is a diagram showing an example of a process sequence in the movable shop management system.

FIG. 14 is a diagram showing an example of a process sequence in the movable shop management system 100. In S11, for example, after the business hours, a staff of the shop 4 registers and loads the product in the vehicle 2, and performs an input operation for the instruction of the operation start, to the vehicle 2. Then, the vehicle 2 sends the notice of the operation start and the load ratio, to the center server 1. The center server 1 receives the notice of the operation start and the load ratio, from the vehicle 2 (FIG. 10, OP101: YES).

In S12, the center server 1 generates the route information about the initial route, based on the load ratio of the vehicle 2 (FIG. 10, OP102). In S13, the center server 1 sends the operation command and the route information about the initial route, to the vehicle 2 (FIG. 10, OP103). In S14, the center server 1 sends the notice of the operation start of the vehicle 2, to the user terminal 3 that has registered the target region of the shop 4 (FIG. 10, OP104). In S15, the vehicle 2 receives the route information about the initial route from the center server 1, and starts the operation in accordance with the route information about the initial route.

In S21, for example, the vehicle 2 parks at the parking spot on the initial route, and the user comes and purchases the product (FIG. 13, OP401: YES). In S22, the vehicle 2 calculates the load ratio (FIG. 13, OP402), and sends the load ratio to the center server 1 (FIG. 13, OP403). It is assumed that the kind of the foodstuff having the highest value in the load ratio does not change.

In S23, the center server 1 receives the load ratio from the vehicle 2 (FIG. 12, OP301: YES). Since the kind of the foodstuff having the highest value in the load ratio does not change (FIG. 12, OP303: NO), the center server 1 does not alter the route of the vehicle 2.

Next, in S31, the center server 1 receives the stop-off request to the vehicle 2, from the user terminal 3 (FIG. 11, OP201: YES). In S32, the center server 1 generates the route information such that the vehicle 2 goes to the place designated by the user of the user terminal 3 (FIG. 11, OP203). In S33, the center server 1 sends the operation command and the generated route information, to the vehicle 2 (FIG. 11, OP204). The vehicle 2 receives the operation command and the route information from the center server 1, and the vehicle 2 starts to move to the place designated by the user of the user terminal 3.

In S41, the vehicle 2 arrives at the place designated by the user of the user terminal 3, and the user purchases the product (FIG. 13, OP401: YES). In S42, the vehicle 2 calculates the load ratio (FIG. 13, OP402), and sends the load ratio to the center server 1 (FIG. 13, OP403). It is assumed that the kind of the foodstuff having the highest value in the load ratio changes at this time so that the difference between the highest value and the lowest value in the load ratio is equal to or more than the predetermined value.

In S43, the center server 1 receives the load ratio from the vehicle 2 (FIG. 12, OP301: YES), and determines that the kind of the foodstuff having the highest value in the load ratio changes (FIG. 12, OP303: YES). In S44, the center server 1 generates the route information such that the vehicle 2 goes to the region for which it is expected that there is demand for a kind of foodstuff having the highest value in the load ratio (FIG. 12, OP305). In S45, the center server 1 sends the operation command and the generated route information, to the vehicle 2 (FIG. 11, OP204). The vehicle 2 receives the operation command and the route information from the center server 1, and starts to move to the region for which it is expected that there is demand for a kind of foodstuff having the highest value in the load ratio.

Thereafter, the vehicle 2 performs the operation in accordance with the route information. After the cruise, in the case where products remain when the vehicle 2 returns to the shop 4, the vehicle 2 may cruise again. Further, halfway through the cruise, for example, in the case where all products loaded in the vehicle 2 are sold out, where there is no product that can be sold due to the expiration or the like, or where a previously set cruise end hour has come, the vehicle 2 may give a notice to the center server 1, the center server 1 may generate the route information for going to the shop 4, and the vehicle 2 may return to the shop 4.

Function Effect of First Embodiment

In the first embodiment, after the business hours of the shop 4, the vehicle 2 cruises as a movable shop having products for each of which the remaining time before the expiration date is short. Thereby, it is possible to further sell products that were not sold out within the business hours, and it is possible to reduce waste of food. Further, a person that cannot come to the shop 4 within the business hours can purchase products at lower prices. Further, in the case where the vehicle 2 is an automatic driving vehicle, it is possible to solve problems of labor cost and late-night work.

In the first embodiment, based on the load ratio of the vehicle 2, the route of the vehicle 2 is controlled such that the vehicle 2 goes to the region for which it is expected that there is demand for a kind of product having a high value in the load ratio. Thereby, it is possible to sell out the products loaded in the vehicle 2 earlier.

Other Embodiments

The above embodiment is just an example, and the disclosure can be appropriately modified to be carried out, without departing from the spirit of the disclosure.

The generation of the route information is performed by the center server 1 in the first embodiment, but may be performed by the vehicle 2. In this case also, the vehicle 2 includes the map information DB 15, the region information DB 17 and the shop information DB 19. However, the vehicle 2 only needs to hold the information relevant to the shop 4 associated with the vehicle 2 and the information relevant to the target region of the shop 4. The vehicle 2 generates the route information by itself based on the load ratio, and operates in accordance with the route information generated by itself.

The management of the product loaded in the vehicle 2 is performed by the vehicle 2 in the first embodiment, but may be performed by the center server 1. In this case, the center server 1 includes the product information DB 27. The center server 1 performs the calculation of the load ratio of the vehicle 2, the update of the product information DB 27, the update of the price of the product, and the like. When the product is purchased, the vehicle 2 only needs to send the information about the purchased product, to the center server 1.

In the first embodiment, the route is controlled depending on the ratio of the kinds of the products loaded in the vehicle 2, but the disclosure is not limited to this. For example, the route is controlled such that the vehicle 2 travels preferentially in a region for which it is expected that there is demand for a kind of product of the products loaded in the vehicle 2, in the order from the product for which the remaining time before the expiration date is shortest. For example, in the case where remaining times before expiration dates of daily dishes are averagely shorter than those of breads, the route information is generated such that the vehicle 2 travels earlier in a region in which there are many single-person households, that is, a region for which it is expected that there is demand for daily dishes. In this case, a product for which the remaining time before the expiration date is shorter is likely to be sold earlier, and therefore, it is possible to reduce waste of food.

In the first embodiment, it is assumed that the vehicle 2 is an automatic driving vehicle. However, the vehicle 2 may be a vehicle that travels by manual driving. In this case, the route information from the center server 1 may be displayed on a navigation system mounted on the vehicle 2.

The processes and means described in the disclosure can be arbitrarily combined to be carried out, as long as the technical consistency is kept.

A process described as a process to be executed by a single device may be executed by a plurality of devices in cooperation. Further, processes described as processes to be executed by different devices may be executed by a single device. In the computer system, the hardware configuration (server configuration) to realize each function can be flexibly modified.

The disclosure can be realized also when a computer program in which the functions described in the above embodiment are implemented is supplied to a computer and one or more processors included in the computer read and execute the program. The computer program may be provided to the computer by a non-transitory computer-readable storage medium that can be connected with a system bus of the computer, or may be provided to the computer through a network. Examples of the non-transitory computer-readable storage medium include an arbitrary type of disc such as a magnetic disc (a Floppy® disc, a hard disc drive (HDD), and the like) and an optical disc (a CD-ROM, a DVD disc, a Blu-ray disc, and the like), a read only memory (ROM), a random access memory (RAM), an EPROM, an EEPROM, a magnetic card, a flash memory, an optical card, and an arbitrary type of medium suitable for storing electronic instructions.

What is claimed is:

1. An information processing system comprising:
    a movable object that operates as a movable shop after business hours of a predetermined shop; and
    a control unit that executes
    acquiring product information, the product information being information relevant to a plurality of foodstuffs loaded in the movable object, each of the plurality of foodstuffs being a product of the predetermined shop and being discounted due to an expiration date, and
    controlling a route of the movable object based on the product information.

2. The information processing system according to claim 1, wherein the control unit controls the route of the movable object, based on a ratio of kinds of the plurality of foodstuffs loaded in the movable object, as the product information.

3. The information processing system according to claim 2, wherein the control unit controls the route of the movable object, such that the movable object goes to a region for which it is predicted that there is demand for a kind of foodstuff having the highest value in the ratio.

4. The information processing system according to claim 2, wherein the control unit alters the route of the movable object, depending on a change in the ratio.

5. The information processing system according to claim 1, wherein the control unit controls the route of the movable object, based on remaining times before expiration dates of the plurality of foodstuffs loaded in the movable object, as the product information.

6. The information processing system according to claim 1, wherein the control unit alters the route such that the movable object goes to a position of a user terminal, when a stop-off request from the user terminal is received.

7. An information processing method comprising:
    acquiring product information, the product information being information relevant to a plurality of foodstuffs loaded in a movable object, the movable object operating as a movable shop after business hours of a predetermined shop, each of the plurality of foodstuffs being a product of the predetermined shop and being discounted due to an expiration date; and
    controlling a route of the movable object based on the product information.

* * * * *